(12) United States Patent
Shiraki et al.

(10) Patent No.: US 6,172,171 B1
(45) Date of Patent: Jan. 9, 2001

(54) MACROAZO COMPOUNDS

(75) Inventors: Kazuo Shiraki; Hiroyuki Tsurumoto; Tomomitsu Abe, all of Saitama (JP)

(73) Assignee: Wako Pure Chemical Industries Ltd., Osaka (JP)

(*) Notice: Under 35 U.S.C. 154(b), the term of this patent shall be extended for 0 days.

(21) Appl. No.: 09/321,620

(22) Filed: May 28, 1999

(30) Foreign Application Priority Data

Jun. 24, 1998 (JP) .................................................. 10-193760
Jul. 28, 1998 (JP) .................................................. 10-227693
Aug. 5, 1998 (JP) .................................................. 10-233559
Aug. 26, 1998 (JP) .................................................. 10-256019

(51) Int. Cl.[7] .............................. C07C 245/00; C08F 4/04

(52) U.S. Cl. ..................................... 526/219.1; 526/219.6; 534/588; 534/595; 534/558; 528/29; 528/33; 556/450

(58) Field of Search .............................. 526/219.1, 219.6; 534/558, 588, 595; 528/29, 33; 556/450

(56) References Cited

U.S. PATENT DOCUMENTS 5,854,406 * 12/1998 Maesawa et al. .
5,965,672 * 10/1999 Agari et al. .

FOREIGN PATENT DOCUMENTS 0 714 925 A2   6/1996  (EP) .
0 811 605 A1  12/1997  (EP) .

OTHER PUBLICATIONS

Chemical Abstracts, vol. 125, No. 12, Sep. 16, 1996 Columbus, Ohio, US;.

Abstract No. 143951, XP002113011 abstract & JP 08134117 A (Asahi Chem. Ind.).

* cited by examiner

Primary Examiner—Robert Dawson
Assistant Examiner—Kuo-Liang Peng
(74) Attorney, Agent, or Firm—Armstrong, Westerman, Hattori, McLeland & Naughton

(57) ABSTRACT

Macroazo compounds, which comprise a repeating unit composed of a moiety of the formula (a), a (b) and a moiety of the formula (c)

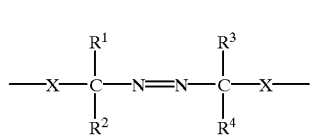

(a)

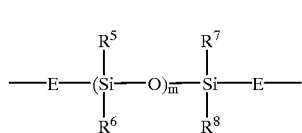

(b)

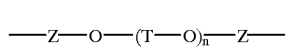

(c)

wherein X, E, Z and T are independently a lower alkylene group, $R^1$, $R^2$, $R^3$ and $R^4$ are independently a lower alkyl group or a cyano group, $R^5$, $R^6$, $R^7$ and $R^8$ are independently a lower alkyl group or an aryl group, and m and n are independently a positive integer, those moieties being bound with one another through a carboxylic acid ester linkage or a carboxylic acid amido linkage, make it possible, for instance, in a case of using the compound as a polymerization initiator, to produce easily and at high efficiency a block polymer containing both polyorganosiloxane units and polyoxyalkylene units in its molecule.

20 Claims, No Drawings

MACROAZO COMPOUNDS

BACKGROUND OF THE INVENTION

This invention relates to novel macroazo compounds containing both of polyorganosiloxane units and polyoxyalkylene units in its molecules.

A silicone compound has such characteristics as excellent water-repellent ability and low coefficient of friction, and thus it has been known that a polysiloxane is added to resins or sprayed over them to give water repellent ability to the resins.

However, in methods of adding or spraying a polysiloxane to resins which has no compatibility or no miscibility with the polysiloxane, there has been found such a defect that the polysiloxane is oozed on the resin surface.

As means for solving this defect, there have been studied such methods as one comprising polymerizing a polymerizable monomer in the presence of a polyorganosilsesquioxane macromonomer or a polydialkylsiloxane macromonomer to form a graft polymer and one comprising polymerizing a polymerizable monomer in the presence of an azo-containing polyorganosiloxane compound to form a block copolymer, whereby a polysiloxane is introduced into a polymer molecule.

However, almost all of thus prepared polysiloxane-containing resins are those containing no polyoxyalkylene unit, or those containing a polyoxyalkylene unit but no polymer unit derived from an ethylenical monomer, and therefore those resins containing polysiloxane have such defects that they show only a poor affinity to polyethylene terephthalate (PET) and acryl type resins and further their hydrophilicity is not sufficient.

Further, though treating methods of mixing or reacting polyethylene glycol which has no compatibility with a polysiloxane resin have been tried, those method are accompanied with such problems that affinity between the resins is low, either one of the resins is oozed on the surface of the other resin which causes reduction of weathering resistance and chemical resistance, or no satisfactory adhesion to a substrate resin is attained which also causes reduction of chemical resistance and abrasion resistance. Thus no practical application has been attained.

SUMMARY OF THE INVENTION

The present invention has been accomplished under the circumstances as mentioned above and it provides a novel macroazo compound which makes it possible, for instance, in a case of using the compound as a polymerization initiator, to produce easily and at high efficiency a block polymer containing both polyorganosiloxane units and polyoxyalkylene units in its molecule.

The present invention relates to a macroazo compound, which comprises a repeating unit composed of a moiety of the formula (a), a moiety of the formula (b) and a moiety of the formula (c)

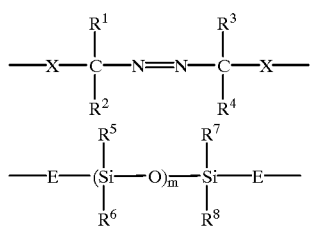

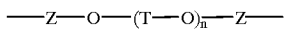

wherein X, E, Z and T are independently a lower alkylene group, $R^1$, $R^2$, $R^3$ and $R^4$ are independently a lower alkyl group or a cyano group, $R^5$, $R^6$, $R^7$ and $R^8$ are independently a lower alkyl group or an aryl group, and m and n are independently a positive integer, those moieties being bound with one another through a carboxylic acid ester linkage or a carboxylic acid amido linkage.

More particularly, the present invention relates to (A) the macroazo compound, wherein the repeating unit contains a polymerized unit composed of the moiety shown by the formula (a) and the moiety shown by the formula (c), the moieties being bound with each other through a carboxylic acid ester linkage or a carboxylic acid amido linkage, and a polymerized unit composed of the moiety shown by the formula (a) and the moiety shown by the formula (b), the moieties being bound with each other through a carboxylic acid ester linkage or a carboxylic acid amido linkage, and (B) the macroazo compound, wherein the repeating unit contains a polymerized unit composed of the moiety shown by the formula (a) and the moiety shown by the formula (b), the moieties being bound with each other through a carboxylic acid amido linkage, and a polymerized unit composed of the moiety shown by the formula (b) and the moiety shown by the formula (c), the moieties being bound with each other through a carboxylic acid amido linkage.

Further, the present invention relates to a polymerization initiator comprising the said compound.

DETAILED DESCRIPTION OF THE PREFERRED EMBODIMENTS

The macroazo compound of the present invention includes one shown by the general formula [1]

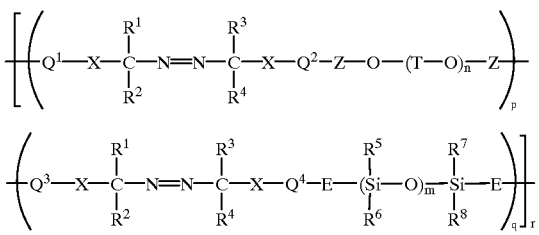

wherein $Q^1$, $Q^2$, $Q^3$ and $Q^4$ are independently a carboxylic acid ester linkage or a carboxylic acid amido linkage, p, q and r are independently a positive integer and $R^1$, $R^2$, $R^3$, $R^4$, $R^5$, $R^6$, $R^7$, $R^8$, X, E, Z, T, m and n are the same meaning as above, and one shown by the general formula [2]

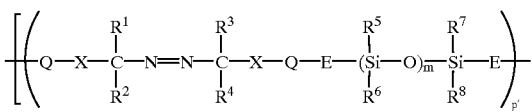

-continued

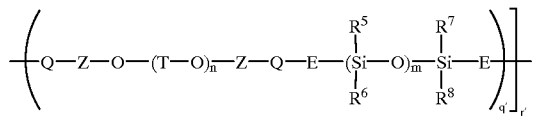

wherein Q is a carboxylic acid amido linkage, p', q' and r' are independently a positive integer, and $R^1$, $R^2$, $R^3$, $R^4$, $R^5$, $R^6$, $R^7$, $R^8$, X, E, Z, T, m and n are the same meaning as above.

The compound shown by the general formula [1] includes one shown by the general formula [11-1

[1]-1

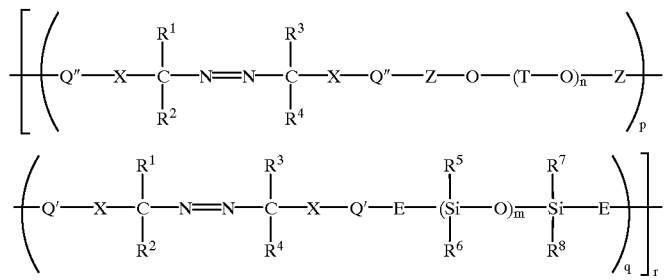

wherein Q' is a carboxylic acid amido linkage, Q" is a carboxylic acid ester linkage, and the other symbols have the same meaning as above, one shown by the general formula [1]-2

[1]1-2

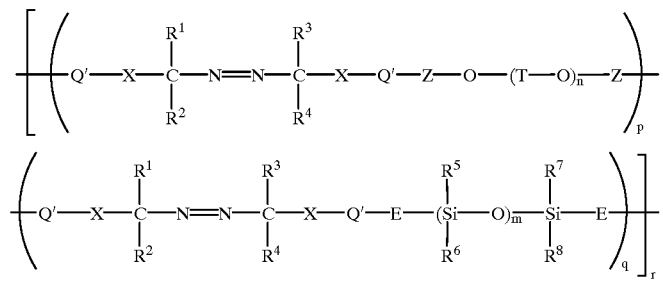

wherein the symbols have the same meaning as above, one shown by the general formula [1]-3

[1]-3

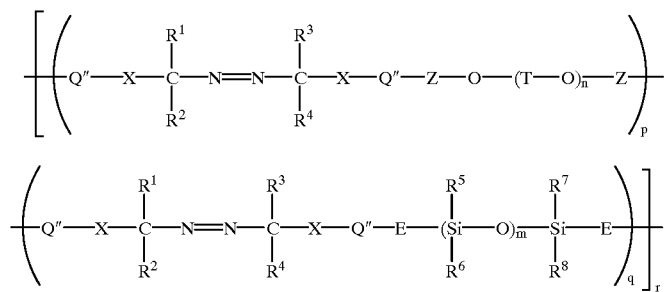

wherein the symbols have the same meaning as above, and one shown by the general formula [1]-4

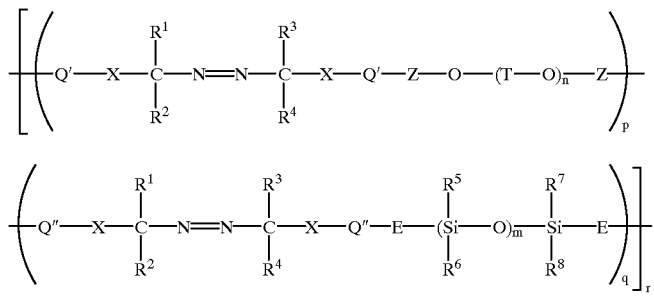

wherein the symbols have the same meaning as above.

In the above general formula of (a), (b), (c), 11], [2], [1]-1, [1]-2, [1]-3 and [1]-4, the lower alkyl group shown by $R^1$, $R^2$, $R^3$, $R^4$, $R^5$, $R^6$, $R^7$ and $R^8$ may be straight chained or branched and includes one having 1 to 6 carbon atoms, which is specifically exemplified by a methyl group, an ethyl group, an n-propyl group, an isopropyl group, an n-butyl group, an isobutyl group, a tert-butyl group, a sec-butyl group, an n-pentyl group, an isopentyl group, a neopentyl group, a tert-pentyl group, a 1-methylpentyl group, an n-hexyl group, an isohexyl group, a 2-methylpentyl group, a 3-methylpentyl group, etc.

The aryl group shown by $R^5$, $R^6$, $R^7$ and $R^8$ includes one having 6 to 10 carbon atoms, which is specifically exemplified by a phenyl group, an o-tolyl group, a m-tolyl group, a p-tolyl group, a 2,3-xylyl group, a 2,4-xylyl group, a 2,5-xylyl group, a naphthyl group, etc.

The lower alkylene group shown by X, E, Z and T may be straight chained, branched or cyclic and includes one having 1 to 10 carbon atoms, preferably 1 to 6 carbon atoms, which is specifically exemplified by a methylene group, an ethylene group, a trimethylene group, a propylene group, a tetramethylene group, a 2-methylpropylene group, a pentamethylene group, a 2-ethylpropylene group, a hexamethylene group, a heptamethylene group, an octamethylene group, a 2-ethylhexamethylene group, a nonamethylene group, a decamethylene group, a cyclopropylene group, a 1,2-cyclopentylene group, a 1,4-cyclohexylene group, etc.

The carboxylic acid ester linkage shown by $Q^1$, $Q^2$, $Q^3$, $Q^4$ and Q" is —COO— or —OCO—.

The carboxylic acid amido linkage shown by Q, $Q^1$, $Q^2$, $Q^3$, $Q^4$ and Q' is —CONH— or —NHCO—.

In the general formula [1], a ratio of p to q is generally $0.1 \leq p/(p+q) \leq 0.9$, preferably $0.25 \leq p/(p+q) \leq 0.75$.

In the general formula [2], a ratio of p' to q' is generally $0.1 \leq p'/(p'+q') \leq 0.9$, preferably $0.25 \leq p'/(p'+q') \leq 0.75$.

The symbols r and r' are generally 2 or more, preferably 2 to 100, and more preferably 2 to 50.

The symbols m and n are generally 5 to 2,000, preferably 5 to 300.

A number average molecular weight of the compound shown by the general formulas [1] and [2] is generally 5,000 to 300,000, preferably 8,000 to 150,000.

The production of the macroazo compound of the present invention that is shown by the general formula [1] is conducted by reacting for instance, an azodicarboxylic acid shown by the general formula [3]

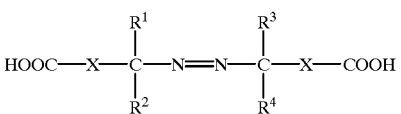

wherein R', $R^2$, $R^3$, $R^4$ and X have the same meaning as above, a polyorganosiloxane compound shown by the general formula [4] or [5]

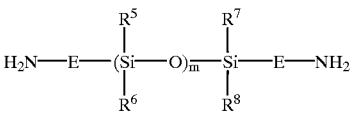

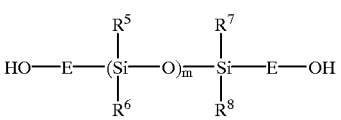

wherein $R^5$, $R^6$, $R^7$, $R^8$, E and m have the same meaning as above, and a polyoxyalkylene compound shown by the general formula [6] or [7]

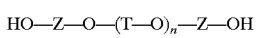

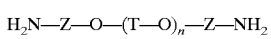

whether Z, T and n have the same meaning as above, are reacted with one another with the use of a condensing agent in a suitable solvent, and if necessary, in the presence of a basic catalyst, whereby the macroazo compound of the present invention can be obtained in one step.

Further the macroazo compound of the above general formula [1] of the present invention can also be obtained by reacting for instance, the azodicarboxylic acid shown by the general formula [3] with, for instance, the polyorganosiloxane shown by the general formula [4] or [5] and then reacting the resultant with, for instance, the polyoxyalkylene compound shown by the general formula [6] or [7] in a suitable solvent, if necessary, in the presence of a basic catalyst with the use of a condensing agent.

Still further, the macroazo compound of the above general formula [1] of the present invention can be obtained by reacting for instance, the azodicarboxylic acid shown by the general formula [3] with, for instance, the polyoxyalkylene compound shown by the general formula [6] or [7] and then reacting the resultant with, for instance, the polyorganosiloxane shown by the general formula [4] or [5] in a suitable solvent with the use of a condensing agent, if necessary, in the presence of a basic catalyst.

When the compound [3], the compound [4] and the compound [6] are reacted with one another by any of above method, a macroazo compound of the general formula [1]-1 is produced.

When the compound [3], the compound [4] and the compound [7] are reacted with one another by any of above method, a macroazo compound of the general formula [1]-2 is produced.

When the compound [3], the compound [5] and the compound [6] are reacted with one another by any of above method, a macroazo compound of the general formula [1]-3 is produced.

When the compound [3], the compound [5] and the compound [7] are reacted with one another by any of above method, a macroazo compound of the general formula [1]-4 is produced.

Specific preferred examples of the azodicarboxylic acid compound shown by the general formula [3] are 4,4'-azobis(4-cyanopentanoic acid), 5,5'-azobis(5-cyanohexanoic acid), 6,6'-azobis(6-cyanoheptanoic acid), 7,7'-azobis(7-cyanooctanoic acid), etc.

Specific examples of the polyorganosiloxane compound shown by the general formula [4] are
α,ω-bis(3-aminopropyl)-polydimethylsiloxane,
α,ω-bis(4-aminobutyl)-polydimethylsiloxane,
α,ω-bis(3-aminopropyl)-polymethylphenylsiloxane,
α,ω-bis(3-aminopropyl)-polydiphenylsiloxane,
α,ω-bis(4-aminobutyl)-polymethylphenylsiloxane,
α,ω-bis(4-aminobutyl)-polydiphenylsiloxane, etc.

Specific examples of the polyorganosiloxane compound shown by the general formula [5] are
α,ω-bis(3-hydroxypropyl)polydimethylsiloxane,
α,ω-bis(4-hydroxybutyl)polydimethylsiloxane,
α,ω-bis(3-hydroxypropyl)polymethylphenyllsiloxane,
α,ω-bis(3-hydroxypropyl)polydiphenylsiloxane,
α,ω-bis(4-hydroxybutyl)polymethylphenylsiloxane,
α,ω-bis(4-hydroxybutyl)polydiphenylsiloxane, etc.

A number average molecular weight of those above compounds shown by the general formulas [4] and [5] is generally 500 to 100,000, preferably 800 to 20,000.

Specific examples of the polyoxyalkylene compound shown by the general formula [6] are polyethylene glycol, polypropylene glycol, polytetramethylene glycol, etc.

Specific examples of the polyoxyalkylene compound shown by the general formula [7] are polyoxyethylenedipropylamine, polyoxyethylenedihexylamine, polyoxytetramethylenedipropylamine, etc.

A number average molecular weight of those above compounds shown by the general formula [6] or [7] is generally 500 to 50,000, preferably 500 to 10,000.

An amount of the azodicarboxylic acid compound shown by the general formula [3] to be used is generally an equimolar or a slightly excess amount to the total moles of the polyorganosiloxane compound shown by the general formula [4] or [5] and the polyoxyalkylene compound shown by the general formula [6] or [7].

Molar ratio of the polyorganosiloxane compound shown by the general formula [4] or [5] and the polyoxyalkylene compound shown by the general formula [6] or [7] to be used is generally 1:9 to 9:1, which may suitably be selected in accordance with the purpose of the use of resulting macroazo compound of the present invention.

The reaction solvent includes hydrocarbons such as toluene, xylene and benzene, halogenated hydrocarbons such as methylene chloride, 1,2-dichloroethane and chloroform, esters such as ethyl acetate and butyl acetate, ketones such as acetone and ethylmethyl ketone, ethers such as dioxane and diisopropylether, tetrahydrofuran, acetonitrile, dimethylformamide, dimethylsulfoxide, etc. These solvents may be used alone or in a suitable combination of two or more thereof.

The basic catalyst includes organic amines such as triethylamine, N,N-dimethylaniline, piperidine, pyridine, 4-dimethylaminopyridine, 1,5-diazabicyclo[4,3,0]non-5-en, 1,8-diazabicyclo[5,4,0]undec-7-en and tri-n-butylamine, alkaline metal compounds such as sodium hydride and n-butyl lithium.

An amount of the basic catalyst to be used is generally 0.005 to 3 moles, preferably 0.01 to 2 moles per mole of the azodicarboxylic acid compound shown by the general formula [3].

The condensing agent includes an inorganic dehydrating agent such as concentrated sulfuric acid, diphosphorus pentoxide and anhydrous zinc chloride, a carbodiimide compound such as dicyclohexylcarbodiimide, diiosproylcarbodiimide and 1-ethyl-3-(3-dimethylaminopropyl)carbodiimide hydrochloride, polyphosphoric acid, acetic anhydride, carbonyldiimidazole, p-toluene sulfonyl chloride, etc.

When an amount of the condensing agent to be used is too small, the reaction speed is too slow, and it is generally 1 to 5 moles, preferably 2 to 3 moles per mole of the azodicarboxylic acid compound shown by the general formula [3] or the total of the polyorganosiloxane compound shown by the general formula [4] or [5] and the polyoxyalkylene compound shown by the general formula [6] or [7].

When a reaction temperature is too high, azo groups are decomposed, and when it is too low, the reaction speed is slow, resulting in a long reaction time and thus it is generally 0 to 40° C.

The reaction time depends on the reaction temperature and the kinds of the azodicarboxylic acid compound, the polyorganosiloxane compound and the polyoxyalkylene compound, and it is generally 1 to 24 hours.

Additionally, in the reaction process as mentioned above, in place of using the azodicarboxylic acid compound shown by the general formula [3] as it is, any one or both thereof may be converted to the corresponding acid chloride compound by the reaction with, for instance, phosphorus pentachloride, thionyl chloride, etc., and then the resultant may be subjected to the reaction in the presence of a basic catalyst.

The production of the macroazo compound of the present invention that is shown by the above general formula [2] is conducted by reacting, for instance, a polyorganosiloxane compound shown by the general formula [4] with, for instance, a polyoxyalkylene compound shown by the general formula [8]

  [8]

wherein the symbols have the same meaning as above, in a suitable solvent, with the use of a condensing agent, and if necessary, in the presence of a basic, and then reacting the resultant with, for instance, an azodicarboxylic acid compound shown by the general formula [3] with the use of a condensing agent, and if necessary, in the presence of a basic catalyst.

The macroazo compound shown by the general formula [2] of the present invention can also be obtained by, at first, reacting, for instance, the polyorganosiloxane compound shown by the general formula [4] with, for instance, the azodicarboxylic acid compound shown by the general formula [3] and then reacting the resultant with, for instance, the polyoxyalkylene compound shown by the general formula [8].

Still further, the macroazo compound of the general formula [2] of the present invention can be obtained by reacting, for instance, the polyorganosiloxane compound shown by the general formula [4], for instance, the polyoxyalkylene compound of the general formula [8] and, for instance, the azodicarboxylic acid compound of the general formula [3] with one another in one step.

The macroazo compound shown by the general formula [2] of the present invention can be obtained any of the above methods, and the methods by two steps, among others, are preferable because of high yield of the object compound.

Specific examples of the polyoxyalkylene compound shown by the general formula [8] are α,ω-bis(carboxymethyl)-poly(oxymethylene), α,ω-bis(carboxymethyl)-poly(oxypropylene), α,ω-bis(carboxymethyl)-poly(oxytetramethylene), etc.

An amount of the polyorganosiloxane compound shown by the general formula [4] to be used is generally an equimolar or a slightly excess amount to the total moles of the azodicarboxylic acid compound shown by the general formula [3] and the polyoxyalkylene compound shown by the general formula [8].

Molar ratio of the polyoxyalkylene compound shown by the general formula [8] to the azodicarboxylic acid compound shown by the general formula [3] to be used is generally 1:9 to 9:1, which may suitably be selected in accordance with the purpose of the use of resulting macroazo compound of the present invention.

In the production of the macroazo compound shown by the general formula [2], the reaction solvent, the basic catalyst and the condensing agent include the same one as used in the production of the macroazo compound shown by the general formula [1].

An amount of the basic catalyst to be used is generally 0.005 to 3 moles, preferably 0.01 to 2 moles per mole of the azodicarboxylic acid compound shown by the general formula [3] and/or the polyoxyalkylene compound shown by the general formula [8].

When an amount of the condensing agent to be used is too small, the reaction speed decreases, and it is generally 1 to 5 moles, preferably 2 to 3 moles per mole of a total amount of the azodicarboxylic acid compound shown by the general formula [3] and the polyoxyalkylene compound shown by the general formula [8].

The reaction temperature and the reaction time are the same as above mentioned in production of the macroazo compound shown by the general formula [1].

Additionally, in the reaction process as mentioned above, in place of subjecting the azodicarboxylic acid compound of the general formula [3] and the polyoxyalkylene compound shown by the general formula [8] as they are, any one or both thereof may be converted to the corresponding acid chloride compound by the reaction with, for instance, phosphorus pentachloride, thionyl chloride, and then the resultant may be subjected to the reaction in the presence of a catalyst.

The catalyst includes the same one of the basic catalysts mentioned above, and the reaction solvent includes the same one as used in the reaction of using the compounds in the form of the free carboxylic acid.

In the production of the macroazo compound shown by the general formula [1] or [2], reaction operations and after-treatments other than the above may be any of conventional ones in a similar kind of reaction.

The macroazo compound of the present invention is easily decomposed to generate radicals together with nitrogen gas by heating or irradiation of lights, and therefore when there are co-existed various kinds of polymerizable monomers in the system, a polymerization reaction rapidly proceeds. Thus the macroazo compound of the present invention can be used as a polymerization initiator for various polymerization reactions.

The macroazo compound of the present invention has such characteristics as above because of the azo groups contained in the molecule, and further shows water-repellent ability by the polyorganosiloxane unit and hydrophilic property by the polyalkylene unit.

That is to say, the macroazo compound of the present invention and a polymerizable monomer are subjected to a polymerization reaction in a suitable solvent or in the absence of a solvent, if necessary, under inert gas atmosphere, whereby various kinds of polymers having water-repellent ability and hydrophilic property can be obtained.

In conducting the polymerization reaction, as occasion demands, a chain transfering agent (for example lauryl mercaptan, octylmercaptan, butyl mercaptan, 2-mercaptoethanol, butyl thioglycolate, etc.) is added to the reaction system to control a molecular weight.

The above polymerization reaction can be conducted by solution, bulk, suspension, emulsion, dispersion and all other kinds of polymerization techniques.

The polymerizable monomer used in the polymerization reaction includes α,β-ethylenically unsaturated monomers such as styrene, 4-methylstyrene, vinyl acetate, acrylic acid, methacrylic acid, methyl methacrylate, ethyl methacrylate, acrylamide, N-vinyl pyrrolidone and vinyl pyridine. These monomers may be used alone or in a suitable combination of two or more thereof.

The solvent used in the polymerization includes ethers such as tetrahydrofuran, diethylether and dioxane, halogenated hydrocarbons such as chloroform, methylene chloride and 1,2-dichloroethane, hydrocarbons such as n-hexane, toluene, benzene and xylene, alcohols such as methanol, ethanol and isopropanol, ketones such as acetone, ethylmethyl ketone and methylisobutyl ketone, acetonitrile, N,N-dimethylformamide, dimethyl sulfoxide, etc. These solvents may be used alone or in a suitable combination of two or more thereof.

The inert gas to be used in the polymerization includes nitrogen gas, argon gas, etc.

An amount of the macroazo compound of the present invention to be used in the above polymerization reaction depends on the kind of the polymerizable monomer to be used, and it is generally 0.01 to 100 wt %, preferably 0.05 to 50 wt % to the polymerizable monomer.

A concentration of the polymerizable monomer in the polymerization reaction depends on the kind of the polymerizable monomer, and it is generally 5 to 100 wt % (no solvent), preferably 10 to 60 wt %.

A reaction temperature is generally 30 to 130° C., preferably 40 to 120° C., more preferably 60 to 90° C.

A reaction time depends on the reaction temperature, the kind and concentration of the polymerizable monomer and other reaction conditions, and it is generally 2 to 24 hours.

Reaction operations and after-treatments other than those mentioned above may be any of conventional ones in a similar kind of reaction.

In this way, various kinds of polymers, particularly various kinds of block polymers can easily be produced with great efficiency by using the macroazo compound of the present invention as a polymerization initiator.

Further the polymers obtained by polymerization reaction of α,ω-ethylenically unsaturated monomer with the use of the macroazo compound of the present invention as a polymerization initiator contain polyorganosiloxane units, polyoxyalkylene units and polymer units of ethylenically unsaturated monomers, and thus they show affinity to PET and acryl resins as well as a water-repellent ability and hydrophilic property derived from the macroazo compound of the present invention, and therefore they can be used in widely expanded area.

In the following, the present invention is further explained in details referring examples and reference examples, but it is not limited thereto by any means.

EXAMPLE

Example 1

In 150 ml of ethyl acetate were dissolved 11.2 g of 4,4'-azobis(4-cyanopentanoic acid), 40 g of polyethylene glycol 2000 (manufactured and sold by Wako Pure Chemical Industries, Ltd.; average molecular weight of 2,000), 32 g of α,ω-bis(3-aminopropyl)polydimethylsiloxane (Trade Name: X-22-161A, manufactured and sold by Shin-Etsu Chemical Co., Ltd.; number average molecular weight of 1,600) and 0.1 g of 4-dimethylaminopyridine, and 17.2 g of dicyclohexylcarbodiimide was added thereto with stirring, followed by reaction at room temperature for 8 hours. After standing overnight, precipitated crystals were removed by filtration, and the filtrate was poured into 1,200 ml of hexane for precipitation. The resulting precipitates were recovered by filtration and dried to give 70 g of the object macroazo compound (yield: 85%). Measurement of the product by GPC found that the product had a number average molecular weight of 12,000 and a dispersity of 1.85.

$^1$H—NMR δ ppm (CDCl$_3$): 0.01 (s, 102H, Si(CH$_3$)$_2$O—), 0.51–0.42 (t, 2H, CONHCH$_2$CH$_2$CH$_2$Si—), 1.42–1.50 (t, 2H, —CONHCH$_2$CH$_2$—), 1.65 (d, 12H, =N—C(CH$_3$)CN—), 2.38 (br, 16H, —CH$_2$CH$_2$COO—), 3.12 (t, 2H, —CONHCH$_2$—), 3.61 (s, 184H, —CH$_2$CH$_2$O—), 4.19 (br, 4H, —COO—CH$_2$CH$_2$O—)

Example 2

In 150 ml of ethyl acetate were dissolved 11.2 g of 4,4'-azobis(4-cyanopentanoic acid), 40 g of polyethylene glycol 2000 (manufactured and sold by Wako Pure Chemical Industries, Ltd.; average molecular weight of 2,000), 88 g of α,ω-bis(3-aminopropyl)polydimethylsiloxane (Trade Name: KF-8012, manufactured and sold by Shin-Etsu Chemical Co., Ltd.; number average molecular weight of 5,000) and 0.1 g of 4-dimethylaminopyridine, and 17.2 g of dicyclohexylcarbodiimide was added thereto with stirring, followed by reaction at room temperature for 8 hours. After standing overnight, precipitated crystals were removed by filtration, and the filtrate was poured into 1200 ml of hexane for precipitation. The resulting precipitates were recovered by filtration and dried to give 67 g of the object macroazo compound (yield: 65%).

Measurement of the product by GPC found that the product had a number 30 average molecular weight of 22,000 and a dispersity of 2.12.

$^1$H-NMR δ ppm (CDCl$_3$): 0.01 (s, 405H, Si (CH$_3$)$_2$O—), 0.51–0.42 (t, 2H, CONHCH$_2$CH$_2$CH$_2$Si—), 1.42–1.50 (t, 2H, —CONHCH$_2$CH$_2$—), 1.65 (d, 12H, =N—C(CH$_3$)CN—), 2.38 (b,r 16H, —CH$_2$CH$_2$COO—), 3.12 (t, 2H, —CONHCH$_2$—), 3.61 (s, 184H, —CH$_2$CH$_2$O—), 4.19 (br, 4H, —COO—CH$_2$CH$_2$O—)

Example 3

In 150 ml of tetrahydrofuran were dissolved 30 g of α,ω-bis(carboxymethyl)-polyoxyethylene (manufactured and sold by Wako Pure Chemical Industries, Ltd.; average molecular weight of 3,000), 32 g of α,ω-bis(3-aminopropyl) polydimethylsiloxane (Trade Name: X-22-161A, manufactured and sold by Shin-Etsu Chemical Co., Ltd.; number average molecular weight of 1,600) and 0.1 g of 4-dimethylaminopyridine, and 4.2 g of dicyclohexylcarbodiimide was added thereto with stirring, followed by reaction at room temperature for 8 hours. After standing overnight, precipitated crystals were removed by filtration, and 2.8g of 4,4'-azobis(4-cyanopentanoic acid) and 4.2 g of dicyclohexylcarbodiimide were added to the filtrate, followed by reaction at room temperature for 8 hours. After standing overnight, precipitated crystals were removed and the filtrate was poured in 1,200 ml of hexane for precipitation. The resulting precipitates were recovered by filtration and dried to give 53 g (yield: 82%) of the object macroazo compound.

Measurement of the product by GPC found that the product had a number average molecular weight of 29,000 and a dispersity of 2.35.

Example 4

In 50 g of toluene were dissolved 12.5 g of the macroazo compound obtained in Example 1 and 50 g of styrene, followed by conducting a polymerization reaction at 80° C. for 8 hours under nitrogen gas atmosphere. The resulting polymerization solution was poured into 1000 ml of hexane to precipitate a polymer. The resulting polymer was recovered by filtration and dried to give 45.6 g of a polymer (polymerization rate; 72%).

Calculation on the basis of NMR analysis found to be a unit composition comprising 9% of a polyorganosiloxane unit, 13% of a polyoxyalkylene unit and 78% of a styrene unit.

Example 5

In 50 g of toluene were dissolved 12.5 g of the macroazo compound obtained in Example 3 and 50 g of styrene, followed by polymerizing at 80° C. for 8 hours under nitrogen gas atmosphere. The resulting polymerization solution was poured into 1000 ml of methanol to precipitate a polymer. The resulting polymer was recovered by filtration and dried to give 41.6 g (polymerization rate of 69%) of a block polymer having a number average molecular weight of 57,000 (dispersity of 2.41).

Calculation on the basis of NMR analysis found that each of unit ratios were 4% of a polyorganosiloxane, 8% of a polyoxyethylene unit and 78% of a styrene unit.

The present invention is to provide a novel macroazo compound containing both of polyorganosiloxane units excellent in water-repellent ability and polyoxyalkylene units excellent in hydrophilic property in the molecule, and by using the macroazo compound as a polymerization initiator, a block polymer containing both of polyorganosiloxane units and polyoxyalkylene units in the molecule can easily and at high efficiency be produced.

What is claimed is:

1. A macroazo compound, which comprises a repeating unit composed of a moiety of the formula (a), a moiety of the formula (b) and a moiety of the formula (c)

(a)

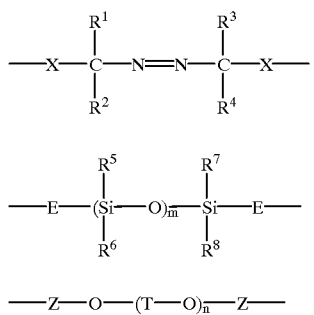

(b)

(c)

wherein X, E, Z and T are independently a lower alkylene group, $R^1$, $R^2$, $R^3$ and $R^4$ are independently a lower alkyl group or a cyano group, $R^5$, $R^6$, $R^7$ and $R^8$ are independently a lower alkyl group or an aryl group, and m and n are independently a positive integer, those moieties being bound with one another through a carboxylic acid ester linkage or a carboxylic acid amido linkage.

2. The macroazo compound according to claim 1, wherein the repeating unit contains a polymerized unit composed of the moiety shown by the formula (a) and the moiety shown by the formula (c), the moieties being bound with each other through a carboxylic acid ester linkage or a carboxylic acid amido linkage, and a polymerized unit composed of the moiety shown by the formula (a) and the moiety shown by the formula (b), the moieties being bound with each other through a carboxylic acid ester linkage or a carboxylic acid amido linkage.

3. The macroazo compound according to claim 1, wherein the repeating unit contains a polymerized unit composed of the moiety shown by the formula (a) and the moiety shown by the formula (b), the moieties being bound with each other through a carboxylic acid amido linkage, and a polymerized unit composed of the moiety shown by the formula (b) and the moiety shown by the formula (c), the moieties being bound with each other through a carboxylic acid amido linkage.

4. The macroazo compound according to claim 1, wherein the compound is one shown by the general formula [1]

(1)

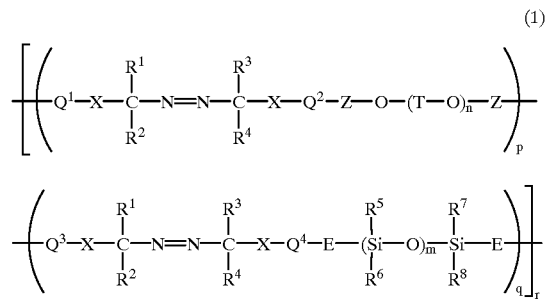

wherein $Q^1$, $Q^2$, $Q^3$ and $Q^4$ are independently a carboxylic acid ester linkage or a carboxylic acid amido linkage, p, q and r are independently a positive integer, and $R^1$, $R^2$, $R^3$, $R^4$, $R^5$, $R^6$, $R^7$, $R^8$, X, E, Z, T, m and n are the same meaning as above.

5. The macroazo compound according to claim 1, wherein the compound is one shown by the general formula [2]

[2]

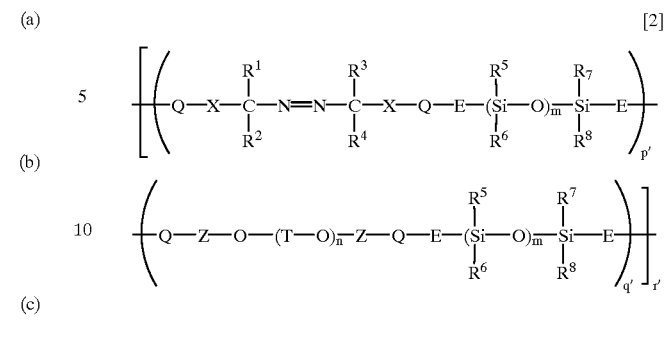

wherein Q is a carboxylic acid amido linkage, p', q' and r' are independently a positive integer, and $R^1$, $R^2$, $R^3$, $R^4$, $R^5$, R, $R^7$, $R^8$, X, E, Z, T, m and n are the same meaning as above.

6. The macroazo compound according to claim 4, wherein the compound of the general formula [1] is shown by the general formula [1]-1

[1]-1

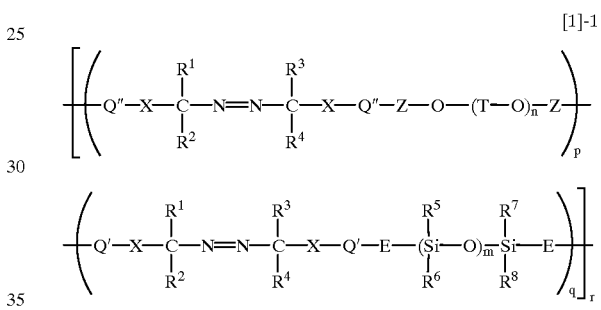

wherein Q' is a carboxylic acid amido linkage, Q" is a carboxylic acid ester linkage, and the other symbols have the same meaning as above.

7. The macroazo compound according to claim 4, wherein the compound of the general formula [1] is shown by the general formula [1]-2

[1]-2

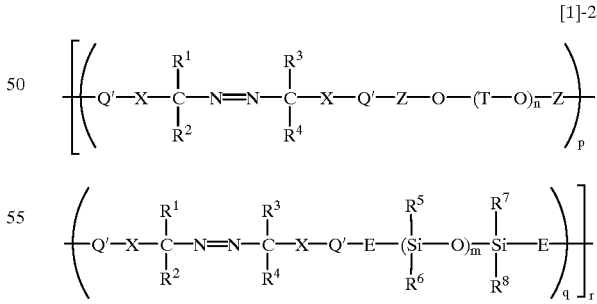

wherein Q' is a carboxylic acid amido linkage, and the other symbols have the same meaning as above.

8. The macroazo compound according to claim 4, wherein the compound of the general formula [1] is shown by the general formula [1]-3

[1]-3

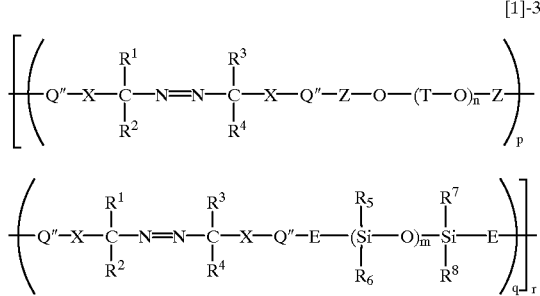

wherein Q" is a carboxylic acid ester linkage, and the other symbols have the same meaning as above.

9. The macroazo compound according to claim 4, wherein the compound of the general formula [1] is shown by the general formula [1]-4

[1]-4

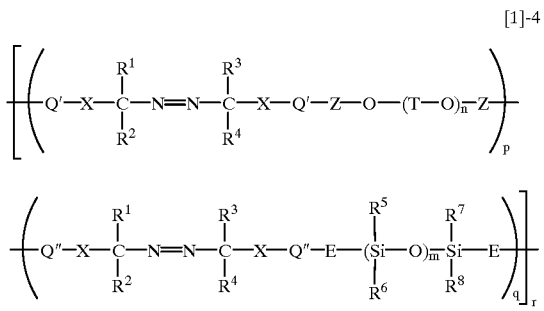

wherein Q' is a carboxylic acid amido linkage, Q" is a carboxylic acid ester linkage, and the other symbols have the same meaning as above.

10. The macroazo compound according to claim 1, wherein the lower alkyl group of $R^1$ to $R^8$ is one having 1 to 6 carbon atoms.

11. The macroazo compound according to claim 1, wherein the aryl group of $R^5$ to $R^8$ is one having 6 to 10 carbon atoms.

12. The macroazo compound according to claim 1, wherein $R^1$, $R^3$ and $R^5$ to $R^8$ are a methyl group.

13. The macroazo compound according to claim 12, wherein $R^2$ and $R^4$ are a cyano group.

14. The macroazo compound according to claim 4, wherein X is an ethylene group.

15. The macroazo compound according to claim 4, wherein E is a trimethylene group.

16. The macroazo compound according to claim 5, wherein E is an ethylene group or a trimethylene group.

17. The macroazo compound according to claim 5, wherein X is an ethylene group.

18. The macroazo compound according to claim 5, wherein $R^1$ and $R^3$ are a methyl group, $R^2$ and $R^4$ are a cyano group, X and T are an ethylene group, $R^5$ to $R^8$ are a methyl group, E is a trimethylene group, and Z is a methylene group.

19. The macroazo compound according to claim 6, wherein $R^1$ and $R^3$ are a methyl group, $R^2$ and $R^4$ are a cyano group, X, T and Z are an ethylene group, and E is a trimethylene group.

20. A polymerization initiator, comprising the macroazo compound claimed in claim 1.

* * * * *